United States Patent
Koutsimanis et al.

(10) Patent No.: US 9,854,537 B2
(45) Date of Patent: *Dec. 26, 2017

(54) METHODS, NETWORK NODE, WIRELESS DEVICE, COMPUTER PROGRAMS AND COMPUTER PROGRAM PRODUCTS FOR ASSISTING DOWNLINK INTERFERENCE ESTIMATION

(71) Applicant: Telefonaktiebolaget L M Ericsson (publ), Stockholm (SE)

(72) Inventors: Chrysostomos Koutsimanis, Stockholm (SE); Erik Dahlman, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 9 days.

This patent is subject to a terminal disclaimer.

(21) Appl. No.: 14/895,157

(22) PCT Filed: Jul. 12, 2013

(86) PCT No.: PCT/SE2013/050897
§ 371 (c)(1),
(2) Date: Dec. 1, 2015

(87) PCT Pub. No.: WO2015/005837
PCT Pub. Date: Jan. 15, 2015

(65) Prior Publication Data
US 2016/0112963 A1    Apr. 21, 2016

(51) Int. Cl.
*H04W 52/24* (2009.01)
*H04B 7/022* (2017.01)
(Continued)

(52) U.S. Cl.
CPC .......... *H04W 52/243* (2013.01); *H04B 7/022* (2013.01); *H04J 11/0023* (2013.01);
(Continued)

(58) Field of Classification Search
CPC . H04W 28/0236; H04W 28/00; H04W 28/08; H04W 72/048; H04W 28/0231;
(Continued)

(56) References Cited

U.S. PATENT DOCUMENTS 6,745,044 B1 * 6/2004 Holtzman ........... H04W 52/223
                                                 455/522
8,792,930 B1 * 7/2014 Gopalakrishnan ..... H01Q 1/243
                                                 455/522
(Continued)

FOREIGN PATENT DOCUMENTS

EP      2557834 A1      2/2013
EP      2663002 A1      11/2013
(Continued)

OTHER PUBLICATIONS

Extended European Search Report for European Patent Application No. 13889017.3, dated Jan. 31, 2017, 8 pages.
(Continued)

*Primary Examiner* — Meless Zewdu
(74) *Attorney, Agent, or Firm* — Withrow & Terranova, PLLC

(57) ABSTRACT

It is presented a method for assisting downlink interference estimation in a cellular network. The method is performed in a network node of the cellular network and comprises the steps of: estimating an average transmit power of the network node in a future time period; transmitting a power parameter based on the estimated average transmit power to at least one wireless device being served by the network node; and transmitting a reference signal for downlink interference estimation. A corresponding network node, wireless device, computer programs and computer program products are also presented.

22 Claims, 4 Drawing Sheets

(51) Int. Cl.
  *H04J 11/00* (2006.01)
  *H04L 5/00* (2006.01)
  *H04W 52/22* (2009.01)
  *H04W 52/26* (2009.01)
  *H04L 25/02* (2006.01)

(52) U.S. Cl.
  CPC ............ H04L 5/006 (2013.01); H04L 5/0062 (2013.01); H04L 5/0073 (2013.01); H04W 52/225 (2013.01); H04W 52/267 (2013.01); *H04L 5/0048* (2013.01); *H04L 5/0094* (2013.01); *H04L 25/0228* (2013.01)

(58) Field of Classification Search
  CPC ........... H04W 28/048; H04W 28/0278; H04W 52/243; H04W 28/0284; H04W 52/0232; H04W 52/226; H04W 56/0015; H04W 52/244; H04W 52/143; H04W 52/16; H04W 52/18; H04W 52/225; H04W 52/04; H04W 52/223; H04W 52/267; H04W 52/24; H04W 52/26; H04W 52/22; H04J 11/0023; H04J 11/00; H04B 7/022; H04L 5/0073; H04L 25/0228; H04L 5/0048; H04L 5/006; H04L 5/0062; H04L 5/0094; H04L 5/00
  See application file for complete search history.

(56) References Cited

U.S. PATENT DOCUMENTS

| | | |
|---|---|---|
| 2006/0234704 A1 | 10/2006 | Lee et al. |
| 2010/0202289 A1 | 8/2010 | Madan et al. |
| 2010/0272086 A1* | 10/2010 | Jung ..................... H04W 48/02 370/338 |
| 2011/0086663 A1 | 4/2011 | Gorokhov et al. |
| 2011/0312358 A1 | 12/2011 | Barbieri et al. |
| 2012/0155291 A1 | 6/2012 | Koivisto et al. |
| 2013/0194940 A1 | 8/2013 | Li et al. |
| 2013/0301432 A1 | 11/2013 | Hammarwall et al. |
| 2013/0303090 A1 | 11/2013 | Hammarwall et al. |
| 2014/0141825 A1* | 5/2014 | Koo ..................... H04W 72/082 455/501 |
| 2014/0376430 A1* | 12/2014 | Su ....................... H04W 52/225 370/311 |
| 2015/0358105 A1* | 12/2015 | Jung ..................... H04J 11/0056 370/329 |
| 2016/0157247 A1* | 6/2016 | Koutsimanis ......... H04W 52/22 370/329 |

FOREIGN PATENT DOCUMENTS

| | | |
|---|---|---|
| WO | 0135692 A1 | 5/2001 |
| WO | 2013141541 A1 | 9/2013 |

OTHER PUBLICATIONS

Ericsson, et al., "R1-123829: Interference Measurement Offset," 3rd Generation Partnership Project (3GPP), TSG-RAN WG1 #70, Aug. 13-17, 2012, 3 pages, Qingdao, China.

LG Electronics, "R1-122292: CQI definition for DL CoMP," 3rd Generation Partnership Project (3GPP), TSG RAN WG1 Meeting #69, May 21-25, 2012, 4 pages, Prague, Czech Republic.

International Search Report and Written Opinion for International Patent Application No. PCT/SE2013/050897, dated Apr. 23, 2014, 17 pages.

* cited by examiner

METHODS, NETWORK NODE, WIRELESS DEVICE, COMPUTER PROGRAMS AND COMPUTER PROGRAM PRODUCTS FOR ASSISTING DOWNLINK INTERFERENCE ESTIMATION

This application is a 35 U.S.C. §371 national phase filing of International Application No. PCT/SE2013/050897, filed Jul. 12, 2013, the disclosure of which is incorporated herein by reference in its entirety.

TECHNICAL FIELD

The technology relates to methods, a network node, a wireless device, computer programs and computer program products for assisting downlink interference estimation.

BACKGROUND

Interference or noise estimation plays a key role in the performance of a cellular network. In the case of an LTE (Long Term Evolution) network comprising a number of network nodes (such as radio base stations) and wireless devices (such as instances of user equipment, UE), downlink interference estimation is typically involved in two different processes. The first one is the demodulation of the useful downlink signal from a serving network node. The received signal is usually a mix of the useful signal which carries the information from the serving network node, and interfering signals originating from other network nodes. The receiver attempts to obtain an estimation of the interfering network nodes in order to estimate the useful signal. The more accurate the interference estimation is, the better the reception of useful signal is. The second process is channel quality estimation (CQI). Here, each wireless device should estimate and report to the transmitter the experienced interference. The last one is used in link adaptation (LA) for selecting appropriate modulation and coding rate as well as precoder and rank for the oncoming transmissions. The more accurate the interference estimation is, the better the LA works leading to successful reception. From the above it is obvious that accurate interference estimation can improve data reception at the UE side as well as the overall network performance.

In LTE Release 8, downlink interference estimation for both demodulation and CQI estimation is based on a set of resource elements which are called CRSs (Cell specific Reference Signals). The CRSs are regularly transmitted on every subframe by each network node. They have a predefined density on the frequency domain and thus occupy specific places within a resource block. CRSs are always transmitted from each cell independent of whether the cell is transmitting data or not. This mismatch between data and CRS transmissions leads to a big mismatch between the estimated and the actual data interference.

In LTE Release ii, interference estimation for CQI estimation is also possible based on a set of resource elements which are called IMRs (Interference Measurement Resources). The IMRs are muted resource elements, in which no data or signalling is scheduled, which are used for interference estimation of surrounding cells. They occur in predefined time cycles with a fixed frequency density according to an IMR configuration. The IMRs of a specific cell are thus able to collide with normal data transmissions of other cells with different IMR configurations. Compared to CRS, the mismatch between estimated and actual interference is reduced when the IMRs of a network node collide with actual data transmissions of other cells. In addition, IMRs are muted resource elements thus avoiding the impact of own useful signal on interference estimation. Nevertheless, there can still be a bias in the estimation introduced by cells that reuse the same IMR configuration and thus mute transmissions on the same resource elements. In that case, the wireless device is unable to measure interference from such cells which might lead to interference underestimation. This indicates also that IMR configurations should be carefully planned across the network in order to capture accurate interference levels. Planning imposes an extra constraint on the flexibility of using IMRs. Especially in case of massive or super dense deployments of network nodes, shortage of available IMR configurations might limit performance of interference estimation.

SUMMARY

It is an object to provide a more flexible interference estimation that improves downlink interference estimation compared to the prior art.

According to a first aspect, it is provided a method for assisting downlink interference estimation in a cellular network. The method is performed in a network node of the cellular network and comprises the steps of: estimating an average transmit power of the network node in a future time period; transmitting a power parameter based on the estimated average transmit power to at least one wireless device being served by the network node; and transmitting a reference signal for downlink interference estimation. In this way, the wireless device(s) can estimate interference in accordance with predicted future transmit power of the serving network node, leading to more accurate interference estimation.

The step of estimating an average transmit power may comprise estimating the average transmit power based on an average cell load which is estimated using a buffer status associated with the at least one wireless device being served by the network node. The downlink buffer status is a good indicator of future traffic level and thus future average transmit power.

The step of estimating an average transmit power may comprise estimating the average transmit power based on traffic patterns of services used by the at least one wireless device being served by the network node.

The step of estimating an average transmit power may comprise estimating the average transmit power based on a capability of the at least one wireless device being served by the network node. In this way, an indicator of the maximum traffic that can be received by the wireless device is also considered.

The capability of the at least one wireless device may comprise a maximum supported downlink bitrate and/or a bandwidth support.

The step of estimating an average transmit power may comprise estimating the average transmit power based on an indication of resources which are low utilisation resources which are resources being prevented from being fully used due to downlink inter cell interference. For example, this is used in ICIC (Inter-cell Interference coordination).

In the step of transmitting a power parameter, the power parameter may be a scaling factor indicating the average transmit power of the network node in relation to a reference transmit power of the network node. This makes it convenient for the wireless node(s) to estimate contribution of the serving network node.

The step of transmitting the reference signal may comprise applying the scaling factor to obtain the reference signal. For example, the transmission power for the reference signal can be calculated by multiplying the reference transmit power for the network node with the scaling factor. In this way, the transmitted reference signal itself contains information about the estimated future average transmit power. This improves interference estimation for any wireless devices for which the network node is an interferer, since these wireless devices are made aware of the estimated future average transmit power.

The step of transmitting a reference signal may comprise transmitting the reference signal being specific for the network node at a predefined time and frequency.

According to a second aspect, it is provided a network node arranged to assist downlink interference estimation in a cellular network. The network node comprises: a processor; and memory storing instructions that, when executed by the processor, cause the network node to: estimate an average transmit power of the network node in a future time period; transmit a power parameter based on the estimated average transmit power to at least one wireless device being served by the network node; and transmit a reference signal for downlink interference estimation.

The instructions to estimate an average transmit power may comprise instructions that, when executed by the processor, cause the network node to estimate the average transmit power based on an average cell load which is estimated using a buffer status associated with the at least one wireless device being served by the network node.

The instructions to estimate an average transmit power may comprise instructions that, when executed by the processor, cause the network node to estimate the average transmit power based on traffic patterns of services used by the at least one wireless device being served by the network node.

The instructions to estimate an average transmit power may comprise instructions that, when executed by the processor, cause the network node to estimate the average transmit power based on a capability of the at least one wireless device being served by the network node.

The capability of the at least one wireless device may comprise a maximum supported downlink bitrate and/or a bandwidth support.

The instructions to estimate an average transmit power may comprise instructions that, when executed by the processor, cause the network node to estimate the average transmit power based on an indication of resources which are low utilisation resources which are resources being prevented from being fully used due to inter cell interference.

The instructions to transmit a power parameter may comprise instructions that, when executed by the processor, cause the network node to calculate the power parameter as a scaling factor indicating the average transmit power of the network node in relation to a reference transmit power of the network node.

The instructions to transmit the reference signal comprise instructions that, when executed by the processor, cause the network node to apply the scaling factor to obtain the reference signal.

The instructions to transmit a reference signal may comprise instructions that, when executed by the processor, cause the network node to transmit the reference signal being specific for the network node at a predefined time and frequency.

According to third aspect, it is presented a network node comprising: means for estimating an average transmit power of the network node in a future time period; means for transmitting a power parameter based on the estimated average transmit power to at least one wireless device being served by the network node; and means for transmitting a reference signal for downlink interference estimation.

The means for estimating an average transmit power may comprise means for estimating the average transmit power based on an average cell load which is estimated using a buffer status associated with the at least one wireless device being served by the network node.

The means for estimating an average transmit power may comprise means for estimating the average transmit power based on traffic patterns of services used by the at least one wireless device being served by the network node.

The means for of estimating an average transmit power may comprise means for estimating the average transmit power based on a capability of the at least one wireless device being served by the network node.

The capability of the at least one wireless device may comprise a maximum supported downlink bitrate and/or a bandwidth support.

The means for estimating an average transmit power may comprise means for estimating the average transmit power based on an indication of resources which are low utilisation resources which are resources being prevented from being fully used due to downlink inter cell interference.

The power parameter may be a scaling factor indicating the average transmit power of the network node in relation to a reference transmit power of the network node.

The means for of transmitting the reference signal may comprise means for applying the scaling factor to obtain the reference signal.

The means for transmitting a reference signal may comprise means for transmitting the reference signal being specific for the network node at a predefined time and frequency.

According to a fourth aspect, it is provided a computer program comprising computer program code which, when run on a network node, causes the network node to: estimate an average transmit power of the network node in a future time period; transmit a power parameter based on the estimated average transmit power to at least one wireless device being served by the network node; and transmit a reference signal for downlink interference estimation.

According to a fifth aspect, it is provided a computer program product comprising a computer program according to the fourth aspect and a computer readable means on which the computer program is stored.

According to a sixth aspect, it is provided a method for estimating downlink interference in a cellular network. The method is performed in a wireless device served by a serving network node of the cellular network and comprises the steps of: receiving a power parameter from the serving network node, the power parameter being based on an average transmit power of the serving network node in a future time period; receiving a set of reference signals for downlink interference estimation, the set of reference signals being a combination of reference signals from the serving network node and from a set of interfering network nodes; estimating a contribution of the serving network node in the set of reference signals by considering the power parameter; and estimating interference from the set of interfering network nodes by removing the estimated contribution of the serving network node from the set of reference signals.

According to a seventh aspect, it is provided a wireless device arranged to estimate downlink interference in a cellular network. The wireless device comprises: a processor; and a memory storing instructions that, when executed by the processor, cause the network node to: receive a power parameter from the serving network node, the power parameter being based on an average transmit power of the serving network node in a future time period; receive a set of reference signals for downlink interference estimation, the set of reference signals being a combination of reference signals from the serving network node and from a set of interfering network nodes; estimate a contribution of the serving network node in the set of reference signals by considering the power parameter; and estimate interference from the set of interfering network nodes by removing the estimated contribution of the serving network node from the set of reference signals.

According to an eighth aspect, it is provided a wireless device comprising means for receiving a power parameter from the serving network node, the power parameter being based on an average transmit power of the serving network node in a future time period; means for receiving a set of reference signals for downlink interference estimation, the set of reference signals being a combination of reference signals from the serving network node and from a set of interfering network nodes; means for estimating a contribution of the serving network node in the set of reference signals by considering the power parameter; and means for estimating interference from the set of interfering network nodes by removing the estimated contribution of the serving network node from the set of reference signals.

According to a ninth aspect, it is provided a computer program comprising computer program code which, when run on a wireless device, causes the wireless device to: receive a power parameter from the serving network node, the power parameter being based on an average transmit power of the serving network node in a future time period; receive a set of reference signals for downlink interference estimation, the set of reference signals being a combination of reference signals from the serving network node and from a set of interfering network nodes; estimate a contribution of the serving network node in the set of reference signals by considering the power parameter; and estimate interference from the set of interfering network nodes by removing the estimated contribution of the serving network node from the set of reference signals.

According to a tenth aspect, it is provided a computer program product comprising a computer program according to the ninth and a computer readable means on which the computer program is stored.

It is to be noted that any feature of the first, second, third, fourth, fifth, sixth, seventh, eighth, ninth and tenth aspects may, when appropriate, be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
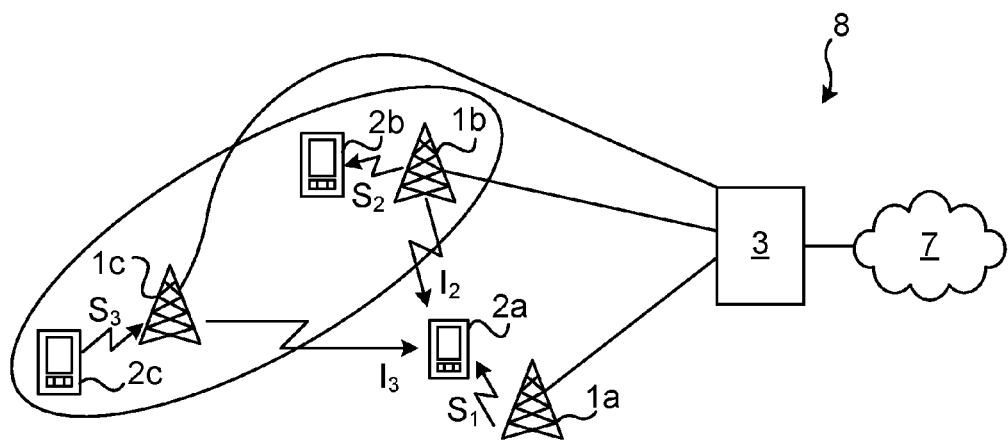
FIG. 1 is a schematic diagram illustrating an environment where embodiments presented herein can be applied.

FIG. 1 is a schematic diagram illustrating an environment where embodiments presented herein can be applied. A cellular network 8 comprises a core network 3 and a radio access network comprising a first network node 1a, a second network node 1b and a third network node 1c. The network nodes 1a-c, are here in the form of evolved Node Bs also known as eNBs but could also be in the form of Node Bs (NodeBs/NBs) and/or BTSs (Base Transceiver Stations) and/or BSSs (Base Station Subsystems), etc. The network nodes 1a-c provide radio connectivity to a plurality of wireless devices 2a-c. The term wireless device is also known as user equipment (UE), mobile terminal, user terminal, user agent, etc.

Each one of the network nodes 1 provides radio coverage in one or more respective radio cells. Uplink (UL) communication, from the wireless devices 2a-c to the network nodes 1a-c, and downlink (DL) communication, from the network nodes 1a-c to the wireless devices 2a-c occur over a wireless radio interface. The radio conditions of the wireless radio interface vary over time and also depend on the position of the respective wireless devices 2a-c, due to effects such as interference, fading, multipath propagation, etc.

The core network 3 provides access to central functions in the mobile communication network and connectivity to other communication networks 7.

The cellular network 8 may e.g. comply with any one or a combination of LTE (Long Term Evolution), UMTS utilising W-CDMA (Wideband Code Division Multiplex), CDMA2000 (Code Division Multiple Access 2000), or any other current or future wireless network, as long as the principles described hereinafter are applicable. Nevertheless, LTE will be used below to fully illustrate a context in which embodiments presented herein can be applied.

Looking now at the radio access network, the first network node 1a provides coverage to a first wireless device 2a, the second network node 1b provides coverage to a second wireless device 2b and the third network node 1c provides coverage to a third wireless device 2C.

The first wireless device 2a receives a first downlink signal $S_1$ from the first network node 1a. The second wireless device 2b receives a second downlink signal $S_2$ from the second network node 1b. The third wireless device 2c receives a third downlink signal $S_3$ from the third network node 1c. However, looking from the perspective of the first wireless device 2a, the second downlink signal $S_2$ also results in a first interfering downlink signal $I_2$ and the third downlink signal $S_3$ also results in a second interfering downlink signal $I_3$.

Downlink interfering signals also exist for the second wireless device 2b and the third wireless device 2c, but these interfering signals are omitted in FIG. 1 for reasons of clarity.

Looking now to FIGS. 2-4, some aspects of channel structure for LTE will be explained.

Figure 2:
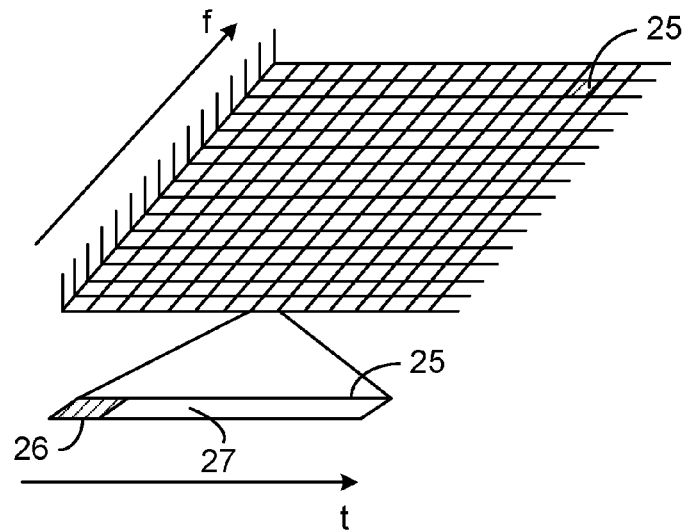
FIG. 2 is a schematic diagram illustrating the physical resources for LTE (Long Term Evolution) downlink.

FIG. 2 is a schematic diagram illustrating the physical resources for downlink communication in LTE (Long Term Evolution). Downlink communication is communication from a network node to a wireless device. LTE uses OFDM (Orthogonal Frequency Division Multiplexing) in the downlink and DFT (Discrete Fourier Transform)-spread OFDM in the uplink. The basic LTE downlink physical resource can thus be seen as a time-frequency grid as illustrated in FIG. 2, where each resource element 25 corresponds to one OFDM subcarrier during one OFDM symbol interval. Each resource element 25 comprises cyclic prefix section 26 and a main section 27.

Figure 3:
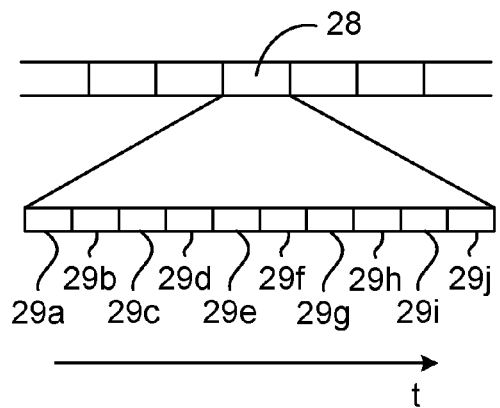
FIG. 3 is a schematic diagram illustrating LTE time-domain structure.

FIG. 3 is a schematic diagram illustrating LTE time-domain structure. In the time domain, LTE downlink transmissions are organised into radio frames 28 of 10 ms, each radio frame consisting of ten equally-sized subframes 29a-j of length $T_{subframe}=1$ ms, as can be seen in FIG. 3.

Figure 4:
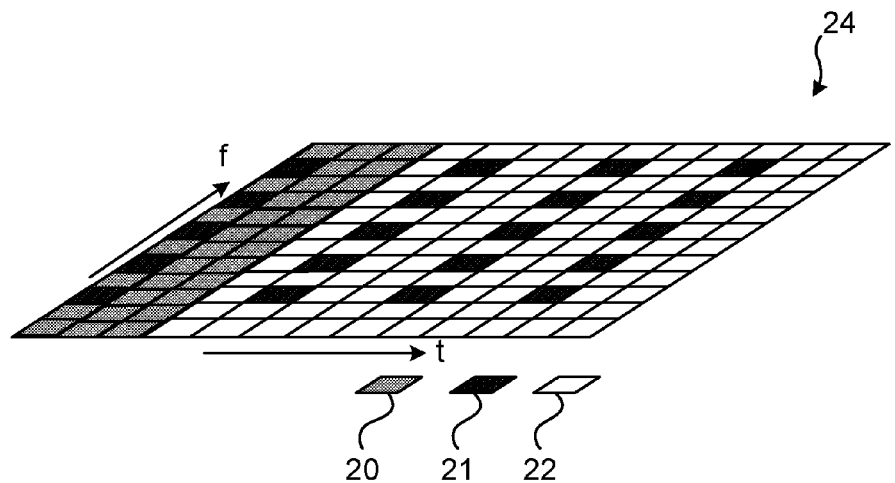
FIG. 4 is a schematic diagram illustrating a downlink resource block.

FIG. 4 is a schematic diagram illustrating a downlink resource block 24. The resource allocation in LTE is typically described in terms of resource blocks (RB), where a resource block can correspond to one or more slots (each 0.5 ms) in the time domain and twelve subcarriers in the frequency domain. A pair of two adjacent resource blocks in the time direction (1.0 ms) is known as a resource block pair. Each resource block comprises a number of resource elements, where each resource element occupies one subcarrier in the frequency domain and one OFDM symbol in the time domain. The number of OFDM symbols in a resource block can vary and can e.g. be six or seven OFDM symbols.

Downlink transmissions are dynamically scheduled, i.e. in each subframe the network node transmits control information about to which wireless devices data is transmitted and upon which resource blocks the data is transmitted, in the current downlink subframe. This control signaling is typically transmitted in a control region 20 in the first one, two or three OFDM symbols in each subframe and the number n=1, 2 or 3 is known as the Control Format Indicator (CFI), thus indicating the number of OFDM symbols being part of the control region 20. The downlink subframe also contains cell specific reference signals (CRS) 21, which are known to the receiver and used for interference estimation and coherent demodulation of, e.g., the control information and payload data. The remaining resource elements are available for payload data 22, also comprising interspersed CRS elements 21. A downlink system with CFI=3 OFDM symbols as control for a resource block 24 is illustrated in FIG. 4.

Figure 5:
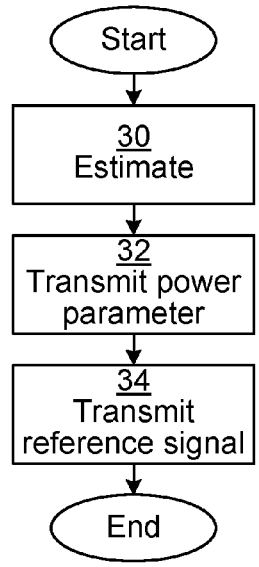
FIG. 5 is a flow chart illustrating a method performed in a network node of FIG. 1 for assisting downlink interference estimation.

FIG. 5 is a flow chart illustrating a method for assisting downlink interference estimation. The method is performed in any one or all of the network nodes 1a-c of FIG. 1.

In an estimate step 32, the network node estimates an average transmit power of the network node in a future time period, yielding an estimated average transmit power.

In one embodiment, the estimation of the average transmit power is based on an average cell load. The average cell load is in turn estimated using a downlink buffer status associated with the wireless devices which are currently being served by the network node. If downlink buffers of the wireless device(s) served by the network node are empty then the resource utilisation and hence the average data transmit power is likely to be very low or even zero. On the other hand, if downlink buffers are not empty, the network node can estimate the average transmit power needed to serve the remaining load based on the size of the downlink buffers and a historic performance of each wireless device. The performance can e.g. be an average throughput for the wireless device.

In one embodiment, the estimation of the average transmit power is based on traffic patterns of services used by the wireless devices which are served by the network node. By using the type of service of each wireless device served by the network node, the network node can predict future traffic and its time dynamics and hence better predict the average transmit power in the future. For example, when a wireless device has a service of best effort traffic, the network node will typically serve that user continuously until its downlink buffer is empty. On the other hand, when the service is TCP traffic then the cell will have to transmit data at specific time instances. More specifically, there are traffic patterns which are typical for services such as voice, streaming video, streaming audio, etc. which can be exploited to improve the estimation of the average transmit power.

In one embodiment, the estimation of the average transmit power is based on a capability of the at least one wireless device being served by the network node. This can be indicated by a category of each wireless device served by the network node. In LTE, a number of categories for wireless devices (or UEs) have been identified, indicating e.g. maximum bitrate and bandwidth support capabilities of the wireless device. For example, a wireless device which can support only up to 5 MHz system bandwidth will occupy half of the available resources provided by a network node with system bandwidth of 10 MHz. Hence, there is only a positive transmit power possible for half of the available system bandwidth.

In one embodiment, the estimation of the average transmit power is based on an indication of resources which are prevented from being used due to downlink inter cell interference, such as in ICIC (Inter-cell Interference coordination). In ICIC, some transmission resource elements of an interfering network node are set to be low utilisation resources which are muted (or reduced in power) to reduce downlink interference to a wireless device served by another network node. Such knowledge of low utilisation resources implying future reduction of transmission power can be considered in the estimation of the average transmit power to improve accuracy even further.

In a transmit power parameter step 32, a power parameter based on the estimation of the average transmit power is transmitted to at least one wireless device being served by the network node 1. This transmission of the power parameter can be a dedicated signal to every wireless device being served by the network node or it can be a broadcast signal which can be received by every wireless device being served by the network node.

In one embodiment, the power parameter is a scaling factor, indicating the average transmit power of the network node in relation to a reference transmit power of the network node for the period in question. In other words, the scaling factor is based on the estimated average transmit power and a reference transmit power of the network node for the period. The reference transmit power can e.g. be a maximum operational power according to a current power level configuration of the network node.

In the transmit reference signal step 34, the network node transmits, in a resource element allocated to interference estimation, a reference signal for downlink interference estimation, e.g. similar to how CRS transmission is performed. In one embodiment, the reference signal is transmitted with a transmission power which is based on the scaling factor, when the scaling factor is available as explained above for the transmit power parameter step 32. For example, the transmission power can be calculated by multiplying a reference transmit power for the network node with the scaling factor.

In one embodiment, the reference signal is specific for the network node at a predefined time and frequency, i.e. different network nodes have different reference signals which are transmitted on the same resource element.

The method illustrated in FIG. 5 can be repeated for a new time period to get a new estimate to keep the interference estimation up to date. The estimate step is then performed at the beginning of each time period.

The length of the time period for which an average transmit power is estimated should be chosen carefully. A shorter time period gives a more accurate estimation of the average transmit power since the estimation will be more representative of the instantaneous downlink transmissions and the estimate will better follow traffic dynamics. However, the time period should be long enough to allow the estimates to occur without excessive use of signalling or available hardware resources.

Moreover, the length of the time period can also depend on the traffic dynamics of each cell. The time period for a cell which experiences static traffic load, and thereby static transmit power, can have a longer time period than a cell which experiences great traffic variation.

In one embodiment, when applied in LTE releases available at the time of filing this patent application, the time period can be the TTI (Transmission Time Interval) which is the length of a subframe, i.e. 1 ms or up to 80 ms. In fact, depending on the application, the time period could be anywhere from a tenth of a ms to several hundreds of ms.

The time period can be a system parameter in the network node that may be reconfigured statically at deployment, semi-statically (e.g. using messaging from higher layers) or even dynamically depending on experienced variation in transmit power.

Figure 6:
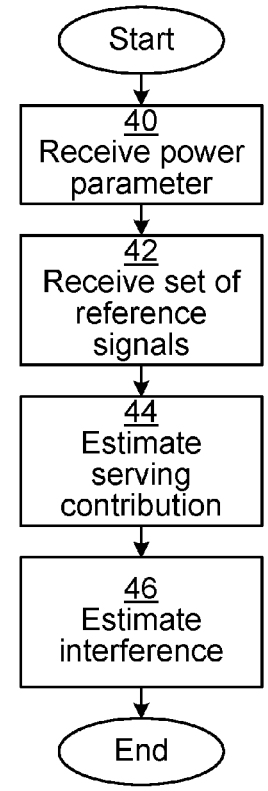
FIG. 6 is a flow chart illustrating a method performed in a wireless device of FIG. 1 for downlink interference estimation.

FIG. 6 is a flow chart illustrating a method for downlink interference estimation. The method is performed in any one or all of the wireless devices 2*a-c* of FIG. 1, being served by a serving network node, see 1*a-c* in FIG. 1, respectively.

In a receive power parameter step 40, a power parameter is received from the serving network node. The power parameter is based on an average transmit power of the serving network node in a future time period.

In a receive set of reference signals step 24, a set of reference signals is received for downlink interference estimation. The set of reference signals is a combination of reference signals from the serving network node and from a set of one or more interfering network nodes.

In an estimate serving contribution step 44, a contribution of the serving network node is estimated in the set of reference signals by considering the power parameter. The contribution of the serving network node is the part of the set of reference signals which originates from the serving network node. The contribution of the serving network node can e.g. be estimated by multiplying the reference signal from the serving network node, which is known to the wireless device, by the scaling factor to reflect an estimated power level of the reference signal.

In an estimate interference step 46, interference from the set of interfering network nodes is estimated by removing the estimated contribution of the serving network node from the set of reference signals.

This method can be repeated to keep the interference estimation up to date.

Figure 7:
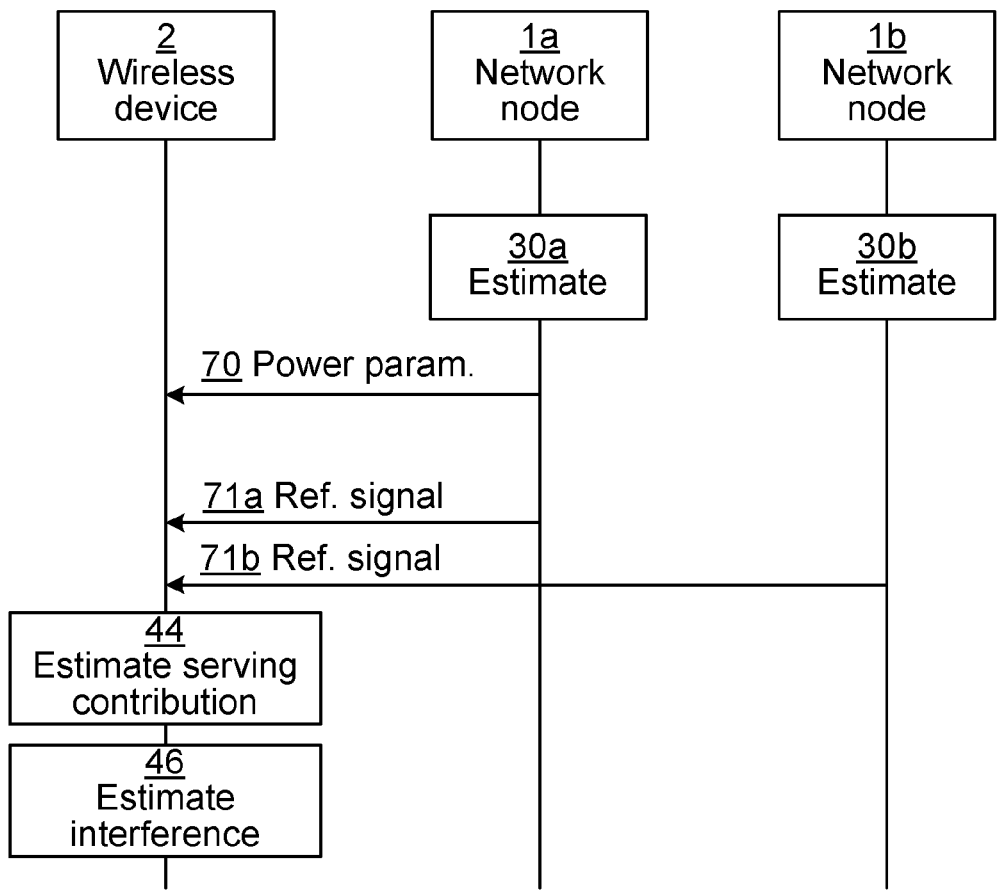
FIG. 7 is a sequence diagram illustrating communication between a network node and a wireless device of FIG. 1.

FIG. 7 is a sequence diagram illustrating communication between two network nodes and a wireless device of FIG. 1. The sequence diagram corresponds to the methods shown in FIGS. 5 and 6 which are described above.

In this example, a wireless device 2 is served by a first network node 1*a*. A second network node 1*b* is an interfering network node for downlink traffic as seen by the wireless device 2.

The first network node 1*a* estimates 30*a* the average transmit power as described above and transmits a power parameter 70 to the wireless device 2 to indicate the result of this estimation. In parallel, the second network node 1*b* estimates 30*b* the average transmit power for itself and transmits a corresponding power parameter (not shown) to any wireless devices served by the second network node 1*b*.

The first network node 1*a* then sends a first reference signal 71*a* in a particular resource element. In the same resource element, the second network node 1*b* sends a second reference signal. The first reference signal 71*a* and the second reference signal 71*b* are combined in the air and received by the wireless device 2. The content of both the first reference signal 71*a* and the second reference signal 71*b* are known to the wireless device, but the strength of the first reference signal 71*a* and the second reference signal 71*b* are not known from the reference signals 71*a-b* themselves. As described above, the first and second reference signals 71*a-b* may be transmitted applied with a respective scaling factor to thereby correspond in transmit power to an estimated future average transmit power, by the first and second network nodes 1*a-b*, respectively.

Using the power parameter 70 from the first network node, the wireless device 2 can estimate the contribution 44 of the serving network node, i.e. the in first network node in this example, as explained above for the estimate serving contribution step 44 illustrated in FIG. 6.

Subsequently, the wireless device estimates the interference 46 it is likely to experience by removing, e.g. subtracting, the contribution of the serving network node from the combined reference signal. When the scaling factor is used by the first and second network nodes 1*a-b* and after the contribution of the first network node 1*a* has been removed, the remaining signal is a good estimate of future interference. This is due to the second reference signal 71*b* corresponding in power to estimated future downlink transmit power for transmissions from the second network node 1*b*. Moreover, the sequence described here can easily be extended to two or more interfering network nodes, where each interfering network node operates as described for the second network node 1*b* above. In other words, multiple network nodes can transmit the reference signals over the same resource elements, since each wireless device removes the contribution of its serving network node to thereby obtain an estimate of all interfering network nodes.

Figure 8:
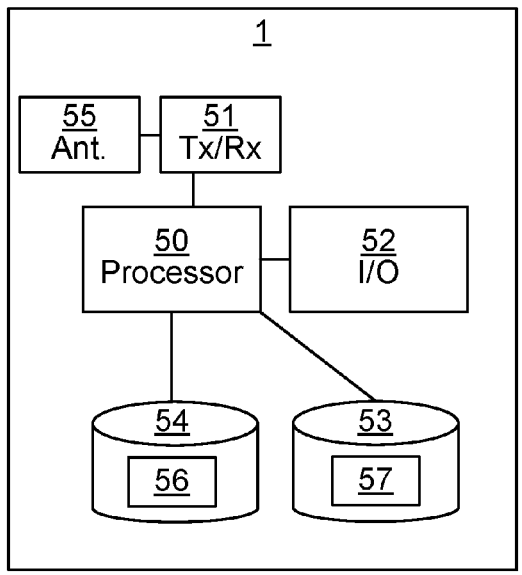
FIG. 8 is a schematic diagram showing some components of any one of the network nodes of FIGS. 1 and 7.

FIG. 8 is a schematic diagram showing some components of any one of the network nodes of FIGS. 1 and 7, here represented by a single network node 1. A processor 50 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 50 can be configured to execute the method described with reference to FIG. 5 above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

The network node 1 further comprises an I/O interface 52 for communicating with the core network and optionally with other network nodes.

The network node 1 also comprises one or more transceivers 51, comprising analogue and digital components, and a suitable number of antennas 55 for radio communication with wireless devices within one or more radio cells, optionally using remote radio units and/or sectors. The processor 50 controls the general operation of the network node 1, e.g. by sending control signals to the transceiver 51 and receiving reports from the transceiver 51 of its operation. In one embodiment, the I/O interface 52 is directly connected to the transceiver 51, whereby data to and from the core network is directly routed between the I/O interface 52 and the transceiver 51.

Other components of the network node 1 are omitted in order not to obscure the concepts presented herein.

Figure 9:
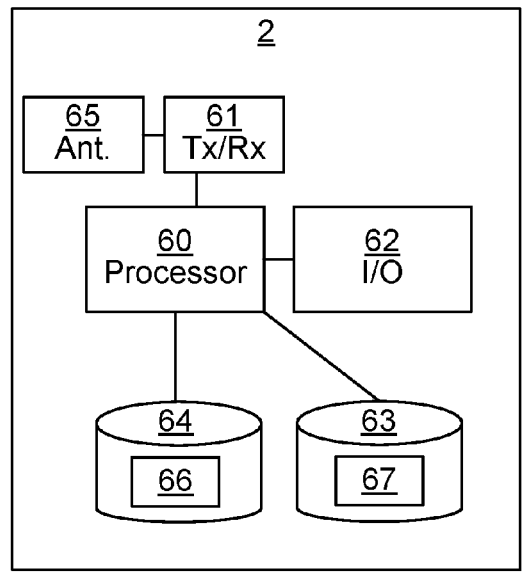
FIG. 9 is a schematic diagram showing some components of any one of the wireless devices of FIGS. 1 and 7.

FIG. 9 is a schematic diagram showing some components of any one of the wireless devices of FIGS. 1 and 7, here represented by a single network node 2. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the method described with reference to FIG. 6 above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

The wireless device 2 further comprises an I/O interface 62. I/O interface can comprise a local I/O interface and/or a user interface including a display, input devices (keypads, touch sensitivity of the screen, etc.), speaker, microphone, etc.

The wireless device 2 also comprises one or more transceivers 61, comprising analogue and digital components, and a suitable number of antennas 65 for radio communication with network node(s). The processor 60 controls the general operation of the wireless device.

Other components of the wireless device 2 are omitted in order not to obscure the concepts presented herein.

Figure 10:
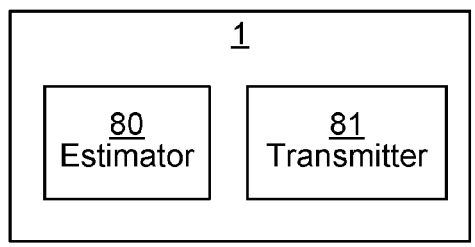
FIG. 10 is a schematic diagram showing functional modules of the network node of FIG. 8.

FIG. 10 is a schematic diagram showing functional modules of the network node 1 of FIG. 8. The modules can be implemented using software instructions such as a computer program executing in the network node 1 and/or using hardware, such as application specific integrated circuits, field programmable gate arrays, discrete logical components, etc. The modules correspond to the steps in the method illustrated in FIG. 5.

An estimator 80 is arranged to estimate an average transmit power of the network node in a future time period. This module corresponds to the estimate step 30 of the method illustrated in FIG. 5.

A transmitter 81 is arranged to transmit a power parameter based on the estimated average transmit power to at least one wireless device being served by the network node 1. Furthermore, the transmitter is arranged to transmit a reference signal for downlink interference estimation. This reference signal can e.g. be received by the at least one wireless devices being served by the network node 1. This module corresponds to the transmit power parameter step 32 and the transmit reference signal step 34 of the method illustrated in FIG. 5.

Figure 11:
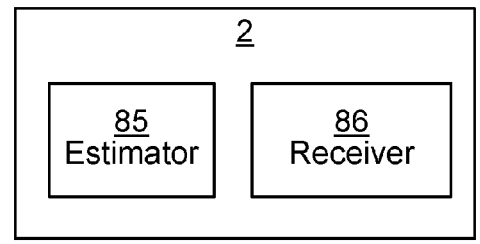
FIG. 11 is a schematic diagram showing functional modules of the wireless device of FIG. 9.

FIG. 11 is a schematic diagram showing functional modules of the wireless device 2 of FIG. 9. The modules can be implemented using software instructions such as a computer program executing in the wireless device 2 and/or using hardware, such as application specific integrated circuits, field programmable gate arrays, discrete logical components, etc. The modules correspond to the steps of the method illustrated in FIG. 6.

A receiver 86 is arranged to receive the power parameter from the serving network node. Moreover, the receiver 86 is arranged to receive a set of reference signals for downlink interference estimation, the set of reference signals being a combination of reference signals from the serving network node and from a set of interfering network nodes. This module corresponds to the receive power parameter step 40 and the receive set of reference signals step 42 of FIG. 6.

An estimator 85 is arranged to estimate a contribution of the serving network node in the set of reference signals by considering the power parameter. The estimator is further arranged to estimate interference from the set of interfering network nodes by removing the estimated contribution of the serving network node from the set of reference signals. This module corresponds to the estimate serving contribution step 44 and the estimate interference step 46 of the method illustrated in FIG. 6.

Figure 12:
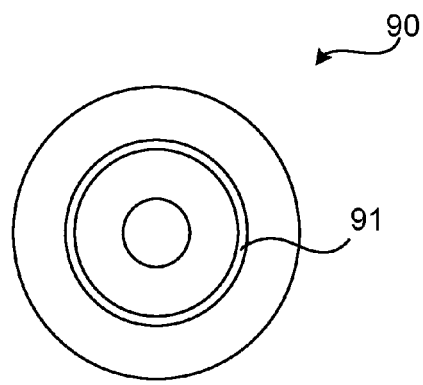
FIG. 12 shows one example of a computer program product 90 comprising computer readable means

FIG. 12 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 8 or the computer program product 66 of FIG. 9. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assisting downlink interference estimation in a cellular network, the method being performed in a network node of the cellular network and comprising the steps of:
estimating an average transmit power of the network node in a future time period;
transmitting a power parameter based on the estimated average transmit power to at least one wireless device being served by the network node; and
transmitting, based on the power parameter, a reference signal for downlink interference estimation.

2. The method according to claim 1, wherein the step of estimating the average transmit power comprises estimating the average transmit power based on an average cell load which is estimated using a buffer status associated with the at least one wireless device being served by the network node.

3. The method according to claim 1, wherein the step of estimating the average transmit power comprises estimating the average transmit power based on traffic patterns of services used by the at least one wireless device being served by the network node.

4. The method according to claim 1, wherein the step of estimating the average transmit power comprises estimating the average transmit power based on a capability of the at least one wireless device being served by the network node.

5. The method according to claim 4, wherein the capability of the at least one wireless device comprises a maximum supported downlink bitrate.

6. The method according to claim 4, wherein the capability of the at least one wireless device comprises a bandwidth support.

7. The method according to claim 1, wherein the step of estimating the average transmit power comprises estimating the average transmit power based on an indication of resources which are low utilisation resources which are resources being prevented from being fully used due to downlink inter cell interference.

8. The method according to claim 1, wherein in the step of transmitting the power parameter, the power parameter is a scaling factor indicating the average transmit power of the network node in relation to a reference transmit power of the network node.

9. The method according to claim 8, wherein the step of transmitting the reference signal comprises applying the scaling factor to obtain the reference signal.

10. The method according to claim 1, wherein the step of transmitting the reference signal comprises transmitting the reference signal being specific for the network node at a predefined time and frequency.

11. A network node arranged to assist downlink interference estimation in a cellular network, the network node comprising:
a processor; and
a memory storing instructions that, when executed by the processor, cause the network node to:
estimate an average transmit power of the network node in a future time period;
transmit a power parameter based on the estimated average transmit power to at least one wireless device being served by the network node; and
transmit, based on the power parameter, a reference signal for the downlink interference estimation.

12. The network node according to claim 11, wherein the instructions to estimate the average transmit power comprise instructions that, when executed by the processor, cause the network node to estimate the average transmit power based on an average cell load which is estimated using a buffer status associated with the at least one wireless device being served by the network node.

13. The network node according to claim 11, wherein the instructions to estimate the average transmit power comprise instructions that, when executed by the processor, cause the network node to estimate the average transmit power based on traffic patterns of services used by the at least one wireless device being served by the network node.

14. The network node according to claim 11, wherein the instructions to estimate the average transmit power comprise instructions that, when executed by the processor, cause the network node to estimate the average transmit power based on a capability of the at least one wireless device being served by the network node.

15. The network node according to claim 14, wherein the capability of the at least one wireless device comprises a maximum supported downlink bitrate.

16. The network node according to claim 14, wherein the capability of the at least one wireless device comprises a bandwidth support.

17. The network node according to claim 11, wherein the instructions to estimate the average transmit power comprise instructions that, when executed by the processor, cause the network node to estimate the average transmit power based on an indication of resources which are low utilisation resources which are resources being prevented from being fully used due to inter cell interference.

18. The network node according to claim 11, wherein the instructions to transmit the power parameter comprise instructions that, when executed by the processor, cause the network node to calculate the power parameter as a scaling factor indicating the average transmit power of the network node in relation to a reference transmit power of the network node.

19. The network node according to claim 18, wherein the instructions to transmit the reference signal comprise instructions that, when executed by the processor, cause the network node to apply the scaling factor to obtain the reference signal.

20. The network node according to claim 11, wherein the instructions to transmit the reference signal comprise instructions that, when executed by the processor, cause the network node to transmit the reference signal being specific for the network node at a predefined time and frequency.

21. A method for estimating downlink interference in a cellular network, performed in a wireless device served by a serving network node of the cellular network and comprising the steps of:
receiving a power parameter from the serving network node, the power parameter being based on an average transmit power of the serving network node in a future time period;
receiving a set of reference signals for downlink interference estimation, the set of reference signals being a combination of reference signals from the serving network node and from a set of interfering network nodes;

estimating a contribution of the serving network node in the set of reference signals by considering the power parameter; and estimating interference from the set of interfering network nodes by removing the estimated contribution of the serving network node from the set of reference signals.

22. A wireless device arranged to estimate downlink interference in a cellular network, the wireless device comprising:

a processor; and a memory storing instructions that, when executed by the processor, cause the network node to:

receive a power parameter from the serving network node, the power parameter being based on an average transmit power of the serving network node in a future time period;

receive a set of reference signals for downlink interference estimation, the set of reference signals being a combination of reference signals from the serving network node and from a set of interfering network nodes;

estimate a contribution of the serving network node in the set of reference signals by considering the power parameter; and estimate interference from the set of interfering network nodes by removing the estimated contribution of the serving network node from the set of reference signals.

* * * * *